Nov. 19, 1957 P. D. ZEMANY 2,814,018

MEASUREMENT OF VOLATILE HALOGEN CONTAINING COMPONENTS

Filed Nov. 26, 1954

Inventor:
Paul D. Zemany,
by Paul A. Frank
His Attorney.

United States Patent Office 2,814,018
Patented Nov. 19, 1957

2,814,018

MEASUREMENT OF VOLATILE HALOGEN CONTAINING COMPONENTS

Paul D. Zemany, Scotia, N. Y., assignor to General Electric Company, a corporation of New York Application November 26, 1954, Serial No. 471,350
4 Claims. (Cl. 324—33)

This invention relates to the quantitative measurement of small amounts of volatile halogen containing compounds.

In systems in which high vacua are desirable, it is necessary that even the smallest leaks be located and eliminated. In other systems where the necessity of maintaining high vacua is not so critical, very small leaks may be tolerated, while larger leaks must be eliminated. In order to determine whether or not a system is effectively sealed for high vacuum work, leak detectors such as halogen vapor detectors are utilized. Halogen vapor detectors operate upon the principle that halogen atoms when contacted with an incandescent body having at the surface thereof, alkali metals or alkali metal compounds, cause the release of alkali metal positive ions. Halogen vapor detectors, as for instance those disclosed in Patent No. 2,550,498 to Chester W. Rice, cause a stream of vapor to flow between a pair of spacially disposed electrodes one of which is heated to incandescence and has upon the surface thereof a small quantity of alkali metal atoms or molecules of alkali containing compounds. If the vapor which flows between the two electrodes contains halogen containing compounds, such compounds, when contacting the incandescent electrode containing the alkali material, cause the release of positive ions of the alkali metal. An electric field is applied between the electrodes with the incandescent electrode positive with respect to the other electrode. Positive ions are then attracted to the non-incandescent electrode. Current flowing between the two electrodes is an indication of the presence of halogen containing materials in the vapor flow. Prior art halogen vapor detectors are, however, not completely satisfactory when it is desired to measure presence of halogen containing volatile components at extremely low pressures. One reason for this is the fact that most halogen vapor detectors contain ceramic members which absorb halogen containing vapors when first exposed thereto and subsequently act as a false source of halogen containing vapors. Additionally, prior art halogen vapor detectors, while giving an indication of the presence or absence of volatile halogen containing materials, are unable to give a quantitative measurement of the concentration of volatile halogen containing compounds in an atmosphere.

An important object, therefore, of my invention is to provide a halogen vapor detector capable of giving a quantitative measurement of volatile halogen containing compounds in a low pressure atmosphere.

A further object of my invention is to provide a halogen vapor detector capable of measuring extremely small accumulations of volatile halogen containing compounds.

Still another object of my invention is to provide a method for detecting quantitatively the absolute amount of halogen containing volatile compounds within a closed system.

In accordance with an important aspect of my invention, there is provided apparatus for halogen vapor detection which includes an electron discharge device having therein a pair of electrodes having an applied potential therebetween. Halogen containing vapor components coming in contact with the electrodes of this electron discharge device cause the formation of positive ions. The creation of positive ions causes a current to flow between the electrodes, and this current is graphically, electronically, or otherwise integrated to give an exact indication of the number of volatile halogen containing constituents within the atmosphere.

The novel features believed characteristic of the invention are set forth in the appended claims. The invention itself, however, together with further objects and advantages thereof may best be understood by referring to the following description taken in connection with the accompanying drawings, in which:

Figure 1:
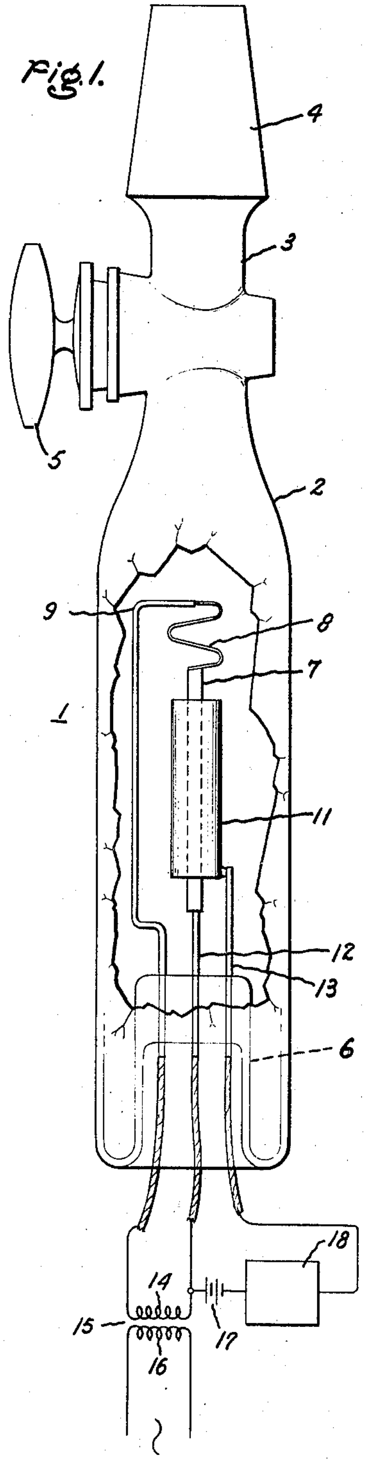
Fig. 1 illustrates a quantitative halogen vapor detector constructed in accordance with my invention.

In Fig. 1 of the drawing, a detector tube which may be utilized in this invention is represented generally as 1. Tube 1 comprises a cylindrical tube 2 of non-conducting non-porous material which may preferably be Pyrex glass, having at one end thereof a neck 3 terminating in a standard taper ground glass joint 4. A stopcock 5 may be located within neck 3 to isolate tube from the ambient atmosphere. Tapered end 4 of tube 2 may be inserted into a corresponding fitting in a vacuum system and connected thereto by means of stopcock 5. The end of tube 2 opposite from neck 3 terminates in a reentrant portion 6 through which leads to the tube electrodes may be secured, as is hereinafter described. Within tube 2 there is located a metallic anode which may conveniently comprise a thin ribbon approximately ⅛" wide and 2" long. Metallic anode 7 may comprise platinum, nickel, tungsten or alumina coated tungsten, or any metal or metallic alloy or compound with sufficient resistivity, and a sufficiently high melting point to become incandescent upon the passage of moderate electric currents therethrough so as to serve as a source of positive ions when contacted by halogen atoms.

Since the tube operates to detect the presence of halogen atoms by the liberation of alkali metal ions at the anode thereof, the presence of alkali metal atoms or alkali metal containing compounds at the surface of anode 7 is necessary. Normal refining and processing of the above-named metals allows the retention of sufficient alkali metal atoms within the metallic anode for this purpose. If, however, a tube with extremely long life is desired, or it is desired to reactivate a detector tube, the surface of anode 7 may be sensitized by the addition of a few micrograms of alkali metal to the surface thereof. Anode 7 may, for purposes of mechanical stability, be terminated at one end by a resilient wire spring 8 coiled in an accordian type pleat and having a thickness of approximately several thousandths of an inch and a width of approximately ⅛". Wire spring 8 may be any metal with a sufficiently high melting point to withstand the temperature of incandescence of anode 7. Thus, spring 8 may conveniently be made of a refractory metal such as molybdenum. Spring 8 serves to maintain anode ribbon 7 in proper tension and alignment and compensates for thermal expansion and contraction thereof. Spring 8 is connected at its upper end to a supporting pin 9 which may conveniently be a 0.060 diameter terminal lead which leaves tube 2 through a vacuum tight seal in reentrant portion 6 of tube 2. Anode 7 is concentrically surrounded by a cylindrically shaped cathode 11 which may conveniently have a diameter of approximately ¼", a length of 1⅜" and a thickness of 0.005%. Cathode 11 may be made of any metal or metal compound suitable for anode 7, for example, platinum, nickel, molybdenum, or tungsten. Anode 7 and cathode 11 are terminated and supported at their lower ends by terminal leads 12 and 13 respectively which leave envelope 2 by means of vacuum tight seals within reentrant portion 6 of tube 2.

To operate tube 1 as a quantitative halogen detector, the secondary winding 14 of an alternating current transformer 15 is connected between anode support 9 and terminal lead 12 of anode 7. Alternating current is applied to the primary winding 16 of transformer 14 and alternating current flows through anode 7 heating it to incandescence. A typical operation temperature for anode 7 may be from 1000° to 1100° C. Anode 7 is maintained at a potential of approximately 2 to 100 volts positive with respect to cathode 11 by means of a source of unidirectional voltage which may conveniently be battery 17. A current recording instrument, or an electronic integrating circuit 18 is placed in series with potential source 17 in the cathode-anode circuit of the detector tube.

The operation of the invention is as follows. Tube 1 is connected to a system in which a measurement is desired to be made of the amount of halogen containing compounds therein. An alternating current potential is applied to the primary 16 of filament transformer inducing an alternating current in secondary 14 which flows through anode 7, spring 8 and anode support 9, heating anode 7 to incandescence. A potential of approximately 2 to 100 volts positive with respect to cathode 11 is applied to anode 7. The systems are interconnected by opening stopcock 5 and the halogen compound bearing atmosphere is brought in contact with the electrodes of detector tube 1. When halogen bearing compounds come in contact with the incandescent anode 7 having a quantity of alkali metal ions at the surface thereof, the halogen atoms cause the formation of positive alkali metal ions at the surface of anode 7. These ions are then accelerated under the influence of the electric field between anode 7 and cathode 11 and impinge upon cathode 11.

I have found that, at low pressure, each halogen atom contained in a volatile halogen containing compound in the system in which halogen detector tube 1 is maintained, causes the formation of a single positive ion at the surface of anode 7. Thus, at pressures below 1 cm. of mercury, all halogen bearing materials within the vacuum system will come into contact with anode 7 and form thereat one positive ion per halogen atom. This permits a quantitative measurement of the exact number of halogen atoms within the atmosphere. For this reason, rather than using a simple current indicating device in series with battery 17, I use a current recording instrument, or a suitable electronic integrating circuit, such devices being well known to the art and readily available commercially.

Figure 2:
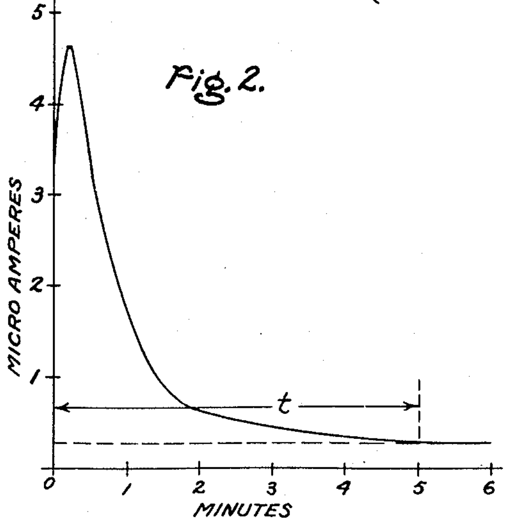
Fig. 2 is a graphical representation of the current characteristic of the device of Fig. 1 due to the admission of a measurable quantity of halogen containing constituents to a low pressure system.

In Fig. 2 of the drawing there is shown a graphical representation of the relationship of current to time in the anode-cathode circuit of detector tube of Fig. 1 when detector tube 1 is connected to a system having therein a partial pressure of volatile halogen containing compounds. The dotted line at approximately 0.35 microampere represents background current and is a level of current constantly flowing in the anode-cathode circuit of tube 1. When the detector tube of Fig. 1 is connected to a halogen containing atmosphere there occurs a sudden increase in current above the background level, and thereafter a logarithmic decrease back down to the background level. This logarithmic decrease may occur over a period of several minutes, but varies in time depending upon the geometry and dimensions of the system and whether the flow conditions are "molecular" or "viscous." When flow conditions are molecular, the entire period of the pulse is only several minutes. Due to the long decay characteristic, ordinary current measuring instruments would not be useful in determining the absolute value of halogen containing compounds in the atmosphere.

However, since current $$i=\frac{dq}{dt}$$

$q$, in this case, represents the number of positive ions which flow from anode to cathode in the period from the beginning of the pulse, at zero time, to the time when the current has effectively fallen to the background level. In the curve of Fig. 2, this time interval is approximately five minutes. Thus, in Fig. 2, the area under the curve and above the background level is representative of the total number of halogen ions in the atmosphere connected to vapor detector tube 1. The exact amount of halogen containing compounds may be determined by recording the curve of Fig. 2 on a recording microammeter or by connecting suitable electronic integrating circuits, well known to the art, in the anode cathode circuit.

The quantitative measurement of the halogen ion content of the atmosphere within a closed system, according to the invention, depends upon the condition that all molecules of volatile, halogen-containing compounds come into contact with incandescent anode 7 of detector tube 2. This condition is satisfied within a very short period of time when the pressure within the vacuum system is within the "region of molecular flow." The pressure region of molecular flow may be defined as that pressure at which the mean free path of gaseous molecules within the system is approximately 10 or more times the cross-sectional diameter of the smallest portion of the system. Thus, for a system in which the smallest diameter is several centimeters, the region of molecular flow may be any pressure of the order of several microns or less. When such a relationship between system dimensions and pressure exists, all halogen containing constituents within the system will come in contact with the incandescent anode of the detector tube during the decay period $t$ on the curve of Fig. 2 within a very short time. At higher pressures where the flow is viscous rather than molecular, diffusion rates limit the time response and the system requires longer time periods for all molecules to contact the tube electrodes. An accurate count may thus be made of the total number of halogen atoms in the system. When the composition of the halogen atom containing gas is known, the number of gaseous molecules within the system may be determined, thus affording an accurate and useful tool for gaseous analysis.

Figure 3:
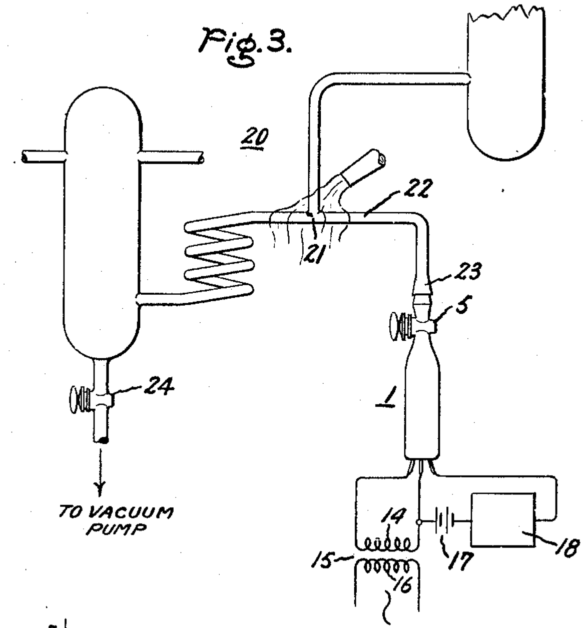
Fig. 3 is an illustration of one method in which the device of Fig. 1 may be used.

The quantitative halogen detection method and apparatus of the invention may be employed in leak detection work. One such application is illustrated in Fig. 3 of the drawing. In Fig. 3, a vacuum system 20 contains a small leak 21 in tube wall 22. To measure this leak, halogen detetctor 1 is inserted in ground glass joint 23 and the system is evacuated to the micron region of pressure, after which the system is isolated from the vacuum pump (not shown) as by closing a stopcock 24. Stopcock 5 in halogen detector 1 is closed, and a stream of a halogen containing gas, as for instance, Freon 12, is directed about the area of leak 21. The process is continued for a given time, for instance several minutes, and then the source of Freon 12 is removed. Stopcock 5 is then opened and a pulse of current, similar to that represented in the curve of Fig. 2 of the drawing, flows in the electrode circuit and is recorded by a recording microammeter or by an electronic integrating circuit 18. The integrated charge which has flowed in the circuit is then a direct indication of the amount of halogen atoms which have flowed into system 20 through leak 21.

As an illustration of the accuracy of the halogen detecting leak measurement method of the invention, the following example may be cited. A calibrated leak was made in a system including the detector tube of Fig. 1. The system was evacuated and Freon 12 was allowed to leak into the system for a period of 2 minutes. The calculated rate of flow of Freon 12 into the system was $1.5\times10^{12}$ molecules per second. In 2 minutes, under controlled conditions $1.8\times10^{14}$ molecules of Freon 12 would be expected to accumulate in the system. Since each molecule of Freon 12 ($CF_2Cl_2$) contains 4 halogen atoms the total number of halogen atoms would be $7.2\times10^{14}$. When the total amount of Freon 12, as calculated above, had entered the system the detector tube was exposed to the gas and a recording microammeter recorded the flow of charge between the electrodes. The resultant current pulse showed a characteristic similar to that shown in Fig. 2. Graphical integration of the area under the curve showed a charge of $1.3\times10^{-4}$ coulombs. This charge is equivalent to $8\times10^{14}$ halogen atoms as compared with the calculated value of $7.2\times10^{14}$ atoms. This agreement of experimental and calculated results is well within the allowable limits of experimental error and shows that the method of this invention provides a useful means of quantitatively measuring small amounts of halogens which is of greater accuracy than any prior art method of comparable complexity and cost. The quantitative halogen detecting apparatus and method of the invention are also useful in detecting the presence of small quantities of halogen containing volatile compounds in the atmosphere. The technique by which such measurements may be made is briefly as follows. The atmosphere which is sought to be analyzed for volatile halogen containing compounds is collected by means of an air pump and passed through a gaseous flow measuring device whereby its volume is measured. The collected air then passes through a liquid nitrogen trap which is maintained at a temperature of the order of —200° C., at which temperature all halogen containing volatile constituents become solid. The liquid nitrogen trap is then evacuated of air while at this low temperature. A halogen detector as illustrated in Fig. 1 is then connected to the liquid nitrogen trap, and the liquid nitrogen is removed. Any frozen halogen containing compounds then become gaseous and activate the halogen detector, which measures the amount of halogen atoms present in the atmosphere. The halogen detector of the invention is capable of detecting and measuring halogen constituents of the atmosphere in quantities as low as a few micrograms.

It will also be appreciated that, although I have described specific embodiments of the invention, many modifications may be made, and I intend by the appended claims to cover all such modifications as fall within the true spirit and scope of the invention.

What I claim as new and desire to secure by Letters Patent of the United States is:

1. The method of measuring the amount of a volatile halogen containing material in a static vacuum system which comprises, reducing the pressure within said system to a pressure of less than 1 centimeter of mercury exposing the atmosphere within said vacuum system to an electron discharge device having two electrodes, one of which is heated to incandescence and liberates positive ions when contacted by halogen atoms, applying an electric field between said electrodes, and measuring the total charge which flows between said electrodes due to the formation of positive ions.

2. The method of measuring the amount of a volatile halogen containing material in a static vacuum system which comprises, lowering the pressure within said system to a pressure lower than 1 centimeter of mercury exposing the atmosphere within said vacuum system to an electron discharge device having two electrodes, one of which is heated to incandescence and liberates positive ions when contacted by halogen atoms, applying an electric field between said electrodes, recording graphically the change in current flow between said electrodes due to the formation of positive ions, and measuring said recorded current flow to determine the total amount of electrical charge carried by said positive ions.

3. The method of quantitatively measuring the amount of a volatile halogen containing material in a static vacuum system which comprises lowering the pressure within said system to a pressure within the region of molecular flow, exposing the atmosphere within said system to an electron discharge device having two electrodes, one of which is heated to incandescence and liberates positive ions when contacted by halogen atoms, applying an electric field between said electrodes, and passing the resultant positive ion current between said electrodes through a current integrating device to record quantitatively the current flow between said electrodes due to the formation of positive ions.

4. The method of quantitatively measuring the amount of halogen containing volatile compounds in an atmosphere which comprises passing a quantity of said atmosphere into a closed system while simultaneously measuring the quantity of said atmosphere which enters said system, passing said collected atmosphere through a liquid nitrogen trap to render the volatile halogen containing compound within said atmosphere solid, evacuating said closed container to remove all of said atmosphere therein not in a solid state, removing the liquid nitrogen from said liquid nitrogen trap to cause the frozen halogen containing compounds to become volatile, connecting said closed system to an electron discharge device having two electrodes, one of which is heated to incandescence and liberates positive ions when contacted by halogan atoms, applying an electric field between said electrodes, recording graphically the changes in recorded flow between said electrodes due to the formation of positive ions, and integrating said recorded current flow to determine the total amount of electrical charge carried by said positive ions.

References Cited in the file of this patent

UNITED STATES PATENTS

| | | |
|---|---|---|
| 1,421,720 | Roberts | July 4, 1922 |
| 2,579,352 | White | Dec. 18, 1951 |
| 2,591,485 | White | Apr. 1, 1952 |